INVENTOR.
Emil C. Walker
BY James E. Tracy
Attorney

INVENTOR.
Emil C. Walker
BY James E. Tracy
Attorney

INVENTOR.
Emil C. Walker
BY James E. Tracy
Attorney

Sept. 29, 1970 E. C. WALKER 3,531,582

SUBSCRIPTION TELEVISION RECEIVER WITH REMOVABLE CODE-BEARING ELEMENT

Filed Dec. 15, 1965 5 Sheets-Sheet 4

INVENTOR.
Emil C. Walker
BY James E. Tracy
Attorney

Sept. 29, 1970 E. C. WALKER 3,531,582

SUBSCRIPTION TELEVISION RECEIVER WITH REMOVABLE CODE-BEARING ELEMENT

Filed Dec. 15, 1965 5 Sheets-Sheet 5

INVENTOR.
Emil C. Walker
BY James E. Tracy
Attorney

United States Patent Office 3,531,582
Patented Sept. 29, 1970

3,531,582
SUBSCRIPTION TELEVISION RECEIVER WITH REMOVABLE CODE-BEARING ELEMENT

Emil C. Walker, Woodstock, Ill., assignor to Zenith Radio Corporation, Chicago, Ill., a corporation of Delaware Filed Dec. 15, 1965, Ser. No. 514,050
Int. Cl. H04n *1/00*
U.S. Cl. 178—5.1 9 Claims

ABSTRACT OF THE DISCLOSURE

Code information, required to effect decoding of a given subscription television program, is stored in a removable code-bearing element by means of a plurality of concealed conductive circuit paths insulated from and overlaying each other. Sensing of the hidden code information is made possible by conductive lancing probes or pins that pierce the code-bearing element and engage the conductive paths. The decoding operation may be controlled by a switching apparatus having input and output conductors permutably interconnected via and in accordance with the conductive paths.

Figure 1:
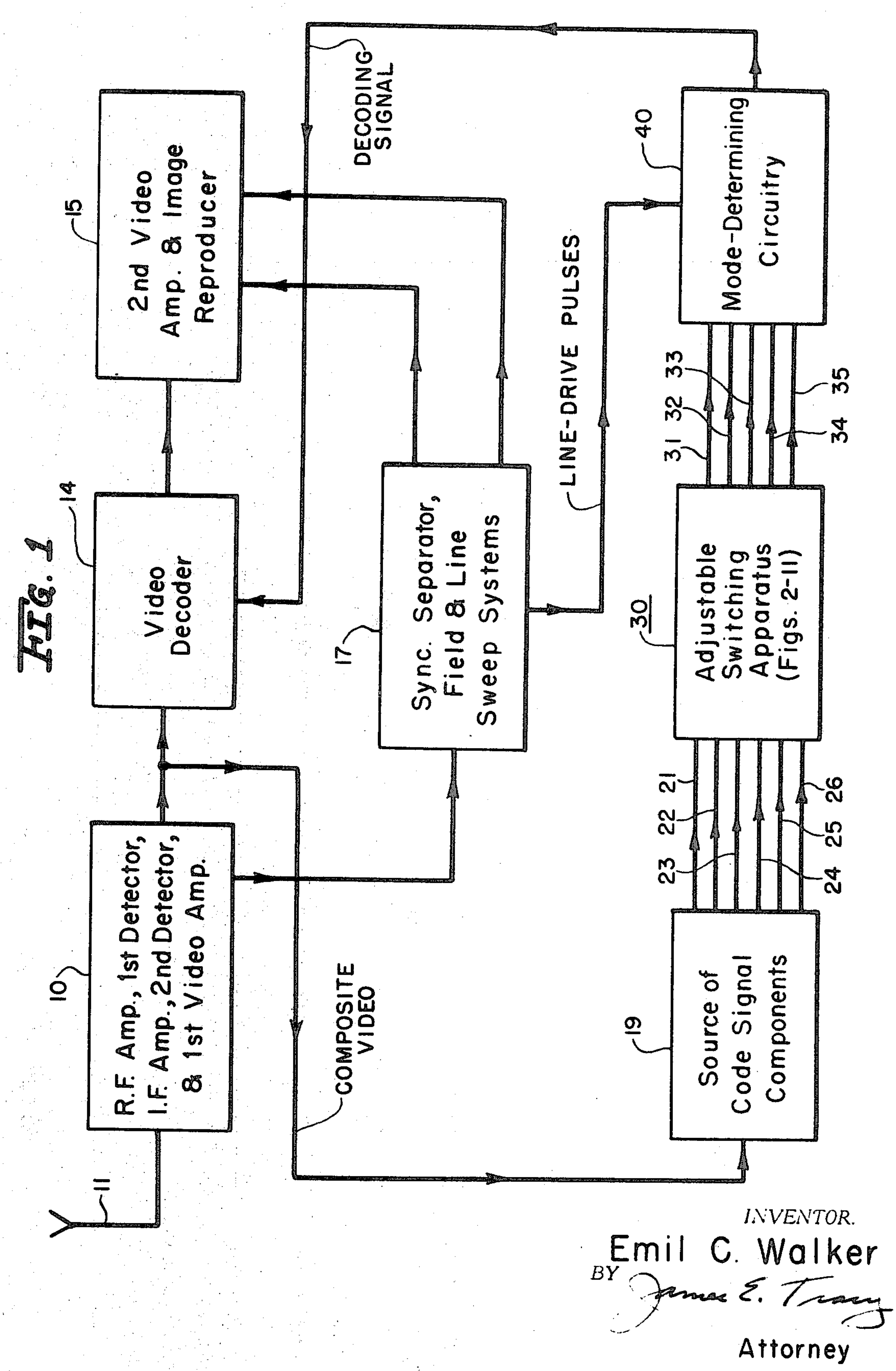

This invention relates in general to a system for sensing or reading out information which has been recorded in a storage element. The invention is particularly useful when incorporated in a subscription television receiver for decoding a received coded television signal, and for that reason will be described in such an environment.

Certain of the features disclosed herein are described and claimed in a copending divisional application, Ser. No. 792,389, filed Jan. 21, 1969.

There are many systems which respond to or are operated in accordance with the stored information on a code-bearing element, such as a code card. For example, the decoding process in a subscription television receiver may be controlled by code information contained in a removable code-bearing element. In one such subscription television system there is an adjustable switching apparatus which must be established in a different condition of adjustment for each subscription television program before the coded television signal for that program may be decoded and intelligibly reproduced. The switching apparatus has a series of input switch contacts and a series of output switch contacts and each different condition of adjustment establishes a different prescribed interconnection pattern between the input and output contacts. Code signal components, applied to the input switch contacts, are permuted by the switching apparatus and are then used to decode the received coded television signal.

The establishment of the switching apparatus in the particular condition of adjustment required to decode any given subscription television program is achieved by means of a removable code-bearing element, inserted in the switching apparatus, containing a unique arrangement of perforations or electrically conductive circuit paths which are sensed by the input and output switch contactst o in-are sensed by the input and output switch contacts to interconnect them in accordance with the particular permutation pattern required to decode the given program. Different arrangements of perforations or conductive paths from the same code-bearing element or from several such removable elements may be employed to effect the different interconnection patterns required to decode different programs.

Of course, the subscriber should be charged only for those selected programs to which he actually subscribes. This may be done by selling to the subscriber a separate code-bearing element, which would effectively constitute a program ticket, for each program he wishes to view.

Alternately, a single code-storage element containing the switch setting information for each of a relatively large number of programs may be employed, and a charge or use recording mechanism may be actuated to register a charge on a recording medium for only those programs decoded by the receiver.

While these prior systems are quite adequate, they do have certain disadvantages when compared to the present invention. For example, the information read-out arrangement of the present invention exhibits economy advantages over those sensing arrangements previously developed. Moreover, the present system achieves a relatively high degree of immunization against unauthorized pirating of stored code information for illicit use.

It is, therefore, an object of the present invention to provide a new and improved recorded information read-out arrangement.

It is another object of the invention to provide a new and improved subscription television receiver.

Another object of the invention is to provide a novel subscription television receiver of the type including a removable code-bearing element.

It is a further object of the invention to provide a novel adjustable switching apparatus.

The invention, in accordance with one of its aspects, relates to a subscription television receiver to which is transmitted coded television signals for a multiplicity of different subscription teleivsion programs. The receiver comprises decoding apparatus which must be provided with predetermined code information for each program before the coded television signal for that program may be decoded and intelligibly reproduced. There is a removable code-bearing element containing in concealed or hidden form a plurality of conductive circuit paths insulated from and overlaying each other and providing the required code information for a given one of the programs. The receiver also comprises sensing means, included in the decoding apparatus, controlled by the subscriber and including a plurality of conductive lancing pins for piercing the code-bearing element to electrically contact the conductive paths and derive the code information stored in the element, thereby to effect decoding of the coded television signal for the given program.

A subscription television receiver, constructed in accordance with another aspect of the invention, comprises an adjustable switching apparatus having a multiplicity of different conditions of adjustment and which must be established in a predetermined condition of adjustment for each program before the coded television signal for that program may be decoded and intelligibly reproduced. A removable switch setting element contains in concealed form a plurality of conductive circuit paths insulated from and overlaying each other and providing code information representing the particular condition of adjustment of the switching apparatus required to decode a given subscription television program. Sensing means, included in the switching apparatus, controlled by the subscriber and including a plurality of conductive lancing pins pierces the switch setting element to electrically contact the conductive paths and derive the code information stored in the element, thereby to establish the switching apparatus in the predetermined condition of adjustment required to decode the given program.

The features of this invention which are believed to be new are set forth with particularity in the appended claims. The invention, together with further objects and advantages thereof, may best be understood, however, by reference to the following desciption in conjunction with the accompanying drawings in which:

FIG. 1 schematically illustrates in block diagram form a subcription television receiver which embodies the invention; and FIGS. 2–11 are various detailed views of portions of the receiver of FIG. 1.

In the illustrated embodiment, the invention has been incorporated into one of assignee's basic subscription television systems. That basic system, in various forms, is shown and described in detail in several patents and copending applications assigned to the assignee of the present application. For example, it is disclosed in Patents 2,910,526, issued Oct. 27, 1959 to Walter S. Druz; 2,995,624 issued Aug. 8, 1961 to Norman T. Watters; 3,081,377 issued Mar. 12, 1963 to Norman T. Watters; 3,081,378 issued Mar. 12, 1963 to Melvin C. Hendrickson; and 3,107,274 issued Oct. 15, 1963 to Erwin M. Roschke. The basic system in question is also shown in detail in copending patent application Ser. No. 169,812, filed Jan. 30, 1962 in the name of George V. Morris and issued Apr. 5, 1966 as Pat. 3,244,806.

Very briefly, assignee's basic subscription television system in which the present invention may be practiced involves coding of the video signal at the transmitter by switching it at random between one operating mode, in which the video is delayed with respect to synchronizing signals, and another mode wherein the video is translated normally or without delay. The mode changes are made in response to the amplitude variations of a rectangular shaped coding signal developed by mode-determining circuitry and the instants at which those amplitude variations occur, and therefore the mode changes, are determined in part by the particular instantaneous adjustment of an adjustable switching apparatus. That apparatus serves to permutably apply a series of random code signal components to a plurality of input circuits of the mode-determining circuitry to effect random actuation thereof. A different adjustment preferably is employed for each subscription telecast or program. The receiver operates in complementary fashion in order to decode the coded video signal produced and transmitted by the transmitter. In other words, a similar mode-determining circuit and switching apparatus, which must be adjusted to the same setting as the switching apparatus at the transmitter, operates in response to the same random code signal components to develop a decoding signal having a waveshape identical to that of the coding signal. The decoding signal is then employed to delay those time intervals or segments of video information which were not delayed at the transmitter, while permitting the delayed intervals of the video signal to be translated through the receiver video channel without delay, thereby to achieve decoding.

The receiver of the basic subscription television system is schematically shown in FIG. 1 and will now be described in greater detail. A more thorough explanation, however, may be found in the aforementioned application and patents. The FIG. 1 drawing is adequate to understand the manner in which the present invention functions in conjunction with a subscription television receiver.

In FIG. 1, a cascaded arrangement of a radio frequency amplifier, a first detector or oscillator-mixer, an intermediate frequency amplifier of one or more stages, a second or video detector, and a first video amplifier is represented by a single block 10 having input terminals connected to a receiving antenna 11 and output terminals coupled through a video decoder 14 to input terminals of a second video amplifier which, in turn, is coupled to the input of an image-reproducing device or picture tube. For convenience, the second video amplifier and image reproducer are represented by a single block 15. Video decoding device 14 may be identical in construction to the video coder employed in the transmitter and includes a time delay network and an electronic switch having two operating conditions. In one condition, the delay network is interposed in the video channel to delay the video with respect to the sync information, and in the other condition the delay network is removed from the video channel so that the video signal is translated through the decoder without the introduction of any significant time delay.

An output of the first video amplifier in block 10 is coupled to a synchronizing signal separator which energizes the usual field-sweep and line-sweep systems that are connected, in turn, to the deflection elements associated with the picture tube in block 15. For convenience, the sync separator, and the field- and line-sweep systems have been shown by a single block 17.

The audio circuitry of the receiver has not been shown in FIG. 1 since it is not necessary to illustrate the operation of the present invention.

The random code signal components, developed in the transmitter and employed to code the video signal, take the form of signal bursts occurring during vertical retrace and exhibiting at random any one of six different frequencies designated $f_1$–$f_6$. In order to control the decoding apparatus at the receiver the code signal bursts are added to the composite video signal in the transmitter during the vertical-retrace intervals. Separating, filtering and rectifying circuitry, shown by block 19, has an input coupled to the output of the first video amplifier in block 10 and produces from the composite video signal during each field-retrace interval rectified code signal bursts of frequencies $f_1$–$f_6$ on respective ones of six different output terminals of block 19.

The six output terminals are respectively connected to six different input conductors 21–26 of an adjustable switching or permuting apparatus 30 which has a series of five output conductors 31–35. Switching apparatus 30 corresponds in function to the switching apparatus referred to above in the transmitter and establishes different prescribed ones of a multiplicity of interconnection or permutation patterns between input conductors 21–26 and output conductors 31–35. A preferred form of switching apparatus 30 is shown in detail in FIGS. 2–11, to be described hereinafter. The transmitter switching apparatus may be identical. Switching apparatus 30 permutes the applied code signal components as required before they are used for decoding the coded video signal.

Output conductors 31–35 are connected to respective ones of a series of five input circuits of a unit 40 referred to as the mode-determining circuitry and which corresponds in construction to the transmitter mode-determining circuitry. Unit 40 has another input circuit connected to the line-sweep system of block 17 to receive line-drive or horizontal-drive pulses thereover. The mode-determining circuitry includes a counting or cycling mechanism provided by a blocking oscillator cascade connected to one or more bistable multivibrators. The blocking oscillator, driven by the line-drive pulses, in turn drives the multivibrator (or multivibrators) the output of which is connected to the electronic switch in video decoding device 14. Mode-determining circuitry 40, in response to the line-drive pulses, therefore produces for application to the video decoder a decoding signal of rectangular waveshape having an amplitude change occurring after every series of a predetermined number of line traces, as determined by the counting ratio of the counting circuits included in the mode-determining circuitry. For example, in the Morris application Ser. No. 169,812 the mode determining circuitry includes a 7:1 blocking oscillator and only one bistable multivibrator; thus, the rectangular shaped decoding signal thereby produced has an amplitude change after every seven line traces.

Output conductors 31–35 may be connected to different inputs of the bistable multivibrator (or multivibrators). Since the code signal components applied to unit 40 via conductors 31–35 occur at random during each field-retrace interval, the periodic actuation of the mode-determining circuitry under the influence of the line-drive pulses is interrupted during each vertical retrace by these code signal components. The effect of the code signal components is to determine the phase of the decoding signal during vertical retrace. Since decoding device 14 is actuated to make a mode change in response to each amplitude change of the decoding signal, the waveform of that decoding signal reflects or represents the code schedule in accordance with which the decoding device operates.

It should be noted that some of the variations of the basic subscription television system in which the present invention may be embodied, as illustrated in the aforementioned patent disclosures, employ less than five input circuits to the mode-determining circuitry. For example, in the Morris application Ser. No. 169,812, which includes in its mode-determining circuitry a blocking oscillator followed by a single multivibrator as stated previously, only three of the five output conductors of the switching apparatus are connected to the mode-determining circuitry, each being connected to a different input of the multivibrator. In the Morris case, one of the output conductors is connected to ground; hence, any code signal components emerging on that output are eliminated and serve no function. The fifth output conductor of the switching apparatus in Morris is connected to a correlation testing arrangement which effectively determines for any given program whether the switching apparatus is established in the particular condition of adjustment required to decode that given program.

Of course, the switching apparatus may have more or less than six inputs and/or more or less than five outputs. In the described system in Pat. 2,995,624—Watters, for example, the switching apparatus has only four output conductors.

Before FIGS. 2–11 are considered and the details of switching apparatus 30 explained, a brief review will be given of the operation of the receiver of FIG. 1. A television signal, which has been coded at the transmitter by delaying certain time segments of video information, is intercepted by antenna 11, amplified in the radio frequency amplifier and heterodyned to the selected intermediate frequency of the receiver in the first detector. The intermediate frequency signal is amplified in the intermediate frequency amplifier and detected in the second detector to produce a coded composite video signal which is then amplified in the first video amplifier. The amplifier video is translated through the cascade arrangement of video decoder 14 and the second video amplifier to the input electrodes of the picture tube in unit 15 to control the intensity of the cathode ray beam thereof in conventional manner. The sweep systems in unit 17 are controlled in conventional manner by the synchronizing signal separator.

Unit 19 separates and rectifies the random code signal components from the composite video signal and applies these components to input conductors 21–26 of switching apparatus 30, the particular adjustment of which determines the permutation routing of those components to output conductors 31–35. Assuming that switching apparatus 30 in the receiver effects the same permutation as the counterpart switching apparatus in the transmitter. the code components will be channeled to the appropriate inputs of mode-determining circuitry 40. That circuitry, which is periodically actuated by the line-drive pulses, is triggered by the random code signal components in exact synchronism with the actuation of the corresponding mode-determining circuitry in the transmitter.

The rectangular shaped decoding signal, produced in the output of the receiver mode-determining circuitry, thus has a waveform which is identical to that of the coding signal in the transmitter. The electronic switch in decoding device 14 will therefore be actuated by the decoding signal in time synchronism with the counterpart electronic switch in the transmitter coder, which is necessary to decode the received coded television.

Figures 2, 3, 4, 5, 6:
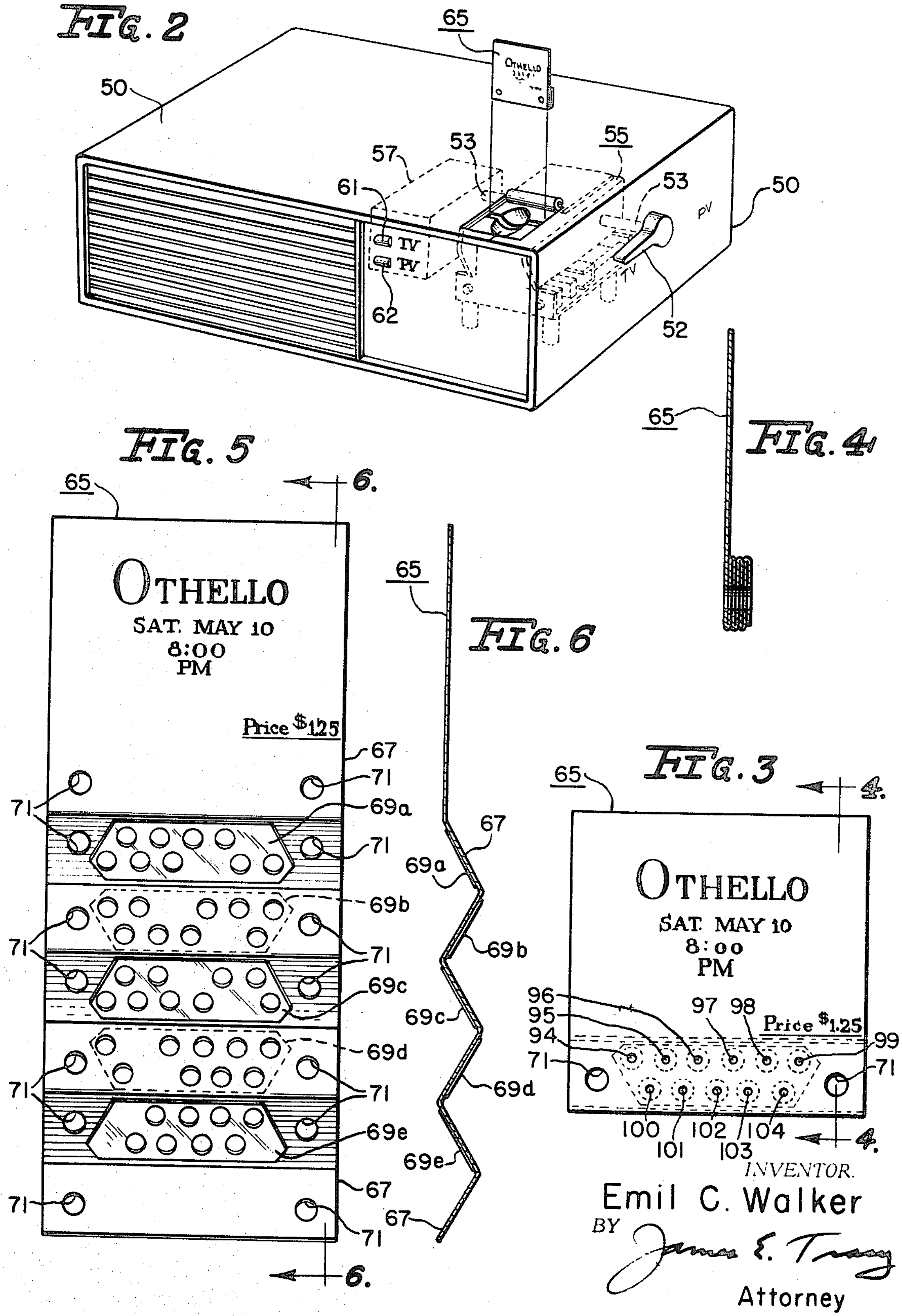

Directing attention now to FIGS. 2–11, and particularly to FIG. 2, all of the circuitry and equipment required to convert a conventional television receiver to the subscription television receiver of FIG. 1 is housed within a metal cabinet 50. Preferably, cabinet 50 is mounted on top of or in close proximity to the conventional television receiver and a cable (not shown) provides the necessary circuit connections therebetween.

A control knob or lever 52, positioned on the outside of the cabinet side exposed in FIG. 2, is rigidly affixed to an operating shaft 53 which extends through the cabinet wall, into and through a sensing mechanism 55, and then into a PV-TV switching unit 57. Knob 52 is to be manipulated by the subscriber to either one of two different operating positions designated PV and TV, respectively. As shown in FIG. 2, knob 52 is established in its TV position; rotating it 180° in a clockwise direction positions the knob in its PV position. Lever 52 is to be actuated by the subscriber to its PV position for the reception and decoding of a subscription television program and to its TV position for the reception of conventional non-subscription programs when the decoding apparatus is to be effectively disassociated from the television receiver. The indicia PV is a shorthand designation of assignee's "Phonevision" subscription television system. PV-TV switching unit 57 is controlled by knob 52 and contains the necessary switches for energizing the decoding apparatus and incorporating it into the conventional television receiver when knob 52 is adjusted to its PV position, and for deenergizing the decoding apparatus and converting the television receiver to its conventional form when the knob is established in its TV position.

A pair of jewels 61, 62 are mounted in and extend through apertures in the front escutcheon of cabinet 50. Included in switching unit 57 and positioned immediately behind respective ones of jewels 61, 62 are a pair of lamps or light sources (not shown). When unit 57 is in its TV condition of adjustment the lamp located behind jewel 61 is energized to illuminate that jewel, whereas when the switching unit is in its PV position the lamp associated with jewel 62 effects illumination thereof.

The establishment of switching apparatus 30 in different switching conditions to achieve different interconnection patterns between input conductors 21–26 and output conductors 31–35 is facilitated by different ones of a series of removable code-bearing elements or code tickets, each of which contains in concealed or hidden form code information representing a different interconnection pattern. In the illustrated embodiment, the stored code information on each code ticket takes the form of a series of concealed electrically conductive circuit paths that are insulated from each other. Preferably, a different code-bearing element will be required to decode each different subscription television program. The particular code ticket which must be used for any given program is inserted in sensing mechanism 55 and the code or switch setting information stored therein is read-out by the mechanism and employed to interconnect input conductors 21–26 to output conductors 31–35 in accordance with the specific interconnection pattern required to decode that given program.

More specifically, one such removable code-bearing element, denoted by the reference numeral 65, is shown in each of FIGS. 4–6. It is contemplated that each subscriber will be supplied, such as at the beginning of each month, with all of the code-bearing tickets needed to decode all of the programs for the month. Each subscriber may subscribe only to those selected programs he wishes by utilizing only the code tickets for those selected programs. As will be seen, each code ticket that is inserted into and sensed by sensing mechanism 55 is effectively marked with a telltale indication evidencing the fact that the code ticket has been used to decode the particular program to which it is assigned. At the end of each month each subscriber may return to the subscription television operating company those code-bearing elements which were not used. A bill may then be prepared and sent back to the subscriber based on the particular used code tickets. In this way, charges are assessed for only those selected programs which the subscriber views.

A portion of code ticket 65 is of laminated construction and it is in that laminated portion that the switch setting information is stored. The construction of code ticket 65 is perhaps best seen in FIGS. 5 and 6 which illustrate the ticket in one of its steps of formation. The final form or completed code-bearing element is shown in FIGS. 3 and 4.

The code ticket is made by initially taking a strip of flat cardboard stock 67. The lower two-thirds of the card, as viewed in FIGS. 5 and 6, is effectively divided and folded into a series of six equal area parallel strips or pleats extending transverse relative to the length dimension of cardboard 67. With the exception thereto the lowermost pleat, each has affixed or cemented thereto a respective one of a series of five electrically conductive metallic, such as aluminum foil, patches **69*a*–69*e* to provide five conductive laminations. Each of conductive patches or laminations 69*a*, 69*c*, and 69*e* is affixed to its assigned pleat on the side of cardboard strip 67 exposed in FIG. 5, while metallic laminations 69*b* and 69*d* are attached to their respective associated pleats on the opposite side of cardboard 67** for reasons which will become apparent.

Each of conductive laminations **69*a*–69*e*, and the cardboard pleat which supports it, is perforated or punched out to provide a pattern or layout of perforations which is different and unique for each lamination. More specifically, each conductive patch 69*a*–69*e* is effectively divided into eleven spaced-apart sensing areas or sections, five of such areas being in one row while the remaining six are in another row. The eleven dashed circles in the FIG. 3 view of the completed code ticket effectively designate the locations of the eleven sensing areas on each conductive lamination. At least one of the spaced apart sensing areas of each row of each conductive lamination is imperforate while the remaining sensing areas of that row are perforated or punched out. Considering conductive lamination 69*a*, for example, as viewed in FIG. 5 there are five sensing areas on the top row or upper half of the lamination and six sensing areas on the bottom row or lower half. The sensing area on the extreme right of the top row and the third sensing area from the right of the bottom row are imperforate while the other nine sensing areas are perforated or apertured. Along each of the right and left margins of cardboard strip 67, as viewed in FIG. 5, is a series of seven equally spaced apertures 71 to provide pilot holes for aligning or indexing code ticket 65 in sensing mechanism 55** in order that eleven sensing elements will register with the eleven sensing areas of each conductive lamination in a manner to be described.

After the patches **69*a*–69*e* are mounted to their associated pleats and all of the required holes are punched, the lower two-thirds of cardboard strip 67 is folded accordion style to assume its final assembled form as shown by FIG. 4. FIG. 6 shows the positions of the pleats when the card is only partially folded. When the folding operation is complete, all of the pleats and their associated conductive laminations 69*a*–69*e* are effectively piled one on top of the other and thus overlay each other. To retain code ticket 65 in its completed form (FIG. 4), while at the same time preventing unauthorized disassembly of the ticket, the pleated or laminated portion is heat seal bonded. In the assembled form of code card 65, the seven holes 71** along each margin register or align with each other as best seen in FIG. 3.

The reason for mounting patches **69*b* and 69*d* on the side of cardboard strip 67 opposite to that on which patches 69*a*, 69*c* and 69*e* are affixed will now be appreciated. This expedient results in a layer or ply of cardboard being disposed between each successive pair of conductive patches in the completed code ticket. The cardboard is a good insulator and thus each of the conductive laminations 69*a*–69*e* is isolated or insulated from all of the others. Hence, the lower portion of the completed code-bearing element 65 is of laminated construction including a series of electrically conductive laminations 69*a*–69*e*** which are insulated and separated from each other by a series of interleaved insulating laminations (namely the cardboard pleats on which the conductive laminations are affixed).

As is apparent in FIGS. 3 and 5, the nonlaminated portion of code ticket 65 has indicia printed thereon designating the specific program which can be decoded with that code ticket. While it has not been shown, the upper portion of each code ticket 65 may contain a field or pattern of holes identifying the ticket for audit purposes, namely to facilitate high speed auditing and billing by means of computing equipment. For example, program and/or subscriber identification may be indicated by an array of punched holes readable by a high speed punch tag reader having computer input. In this way, the computing equipment may read the unused tickets returned to the operating company by each subscriber at the conclusion of each month and automatically prepare a bill for each subscriber for only those programs actually viewed by him.

It will be noted that in the completed code ticket 65 all of the conductive laminations **69*a*–69*e*** are concealed or invisible. This obtains by folding the accordion pleats such that layers of cardboard end up on the two sides of the laminated portion of the code card. The laminated portion, after it is heat seal bonded, essentially becomes a homogeneous mass. As a consequence, if a person bent on fraud attempts to extract surreptitiously the code information recorded within the code ticket he would have to cut into and pry open the bonded laminated portion and in so doing an irreparable telltale injury would result. If he, therefore, attempted to determine the layout of hidden perforations within the code ticket, with an objective of making up a counterfeit or facsimile ticket for his decoding apparatus and returning the legitimate code ticket as an unused ticket for a credit billing, his actions would be detected by the appearance of the returned code ticket since the breaking or severing of the heat seal bond may easily be observed.

Consideration will now be given to the details of the sensing mechanism for reading each of the eleven sensing areas on each of the five conductive laminations **69*a*–69*e*. Sensing mechanism 55 includes a U-shaped metallic base support frame having a bight portion or base 80*a* which is parallel to the bottom of cabinet 50, a front upright support 80*b*, and a back or rear upright support 80*c*. Bight portion 80*a* is supported from the bottom of cabinet 50 by means of four support legs 81. A pair of metallic side plates 83, 84 are rigidly connected to front and back upright supports 80*b*, 80*c*, side plate 83 being affixed to the uprights on the right side thereof, as viewed in FIG. 10, while side plate 84 is attached to the left of upright supports 80*b*, 80*c*. A top plate 82, preferably made of plastic, is rigidly connected to and between side plates 83 and 84**.

A die block 87, preferably constructed of plastic, is rigidly affixed to the rear side of front upright support **80*b*. A pair of guide rods or rails 85, 86 extend between upright supports 80*b*, 80*c* and through channels or bores in die block 87. Each of these guide rods is captivated in position by means of a push-on spring fastener 88, mounted on the rod in front of front upright 80*b*, and by an E-shaped retaining or snap ring 89 mounted in a groove of the guide rod immediately behind die block 87**.

A U-shaped metallic channel support frame 91 is guided by rods 85 and 86 for movement in the axial direction of the rods. This is facilitated by apertures at the terminal ends of channel frame 91 through each of which a respective one of guide rods 85, 86 extends, the diameters of the apertures and of the guide rods being such that channel frame 91 may move freely. Along the open end of U-shaped channel 91 there is rigidly affixed a plastic bar or strip 93. Molded into plastic member 93 are eleven spaced apart, sharp pointed, electrically conductive sensing pins or probes 94–104. As will be seen, the eleven pins 94–104 are provided to pierce the laminated portion of code ticket 65 to sense the eleven sensing areas of each conductive lamination 69*a*–69*e*. Hence, it is appropriate to refer to sensing probes 94–104 as piercing or lancing devices.

Figure 10:
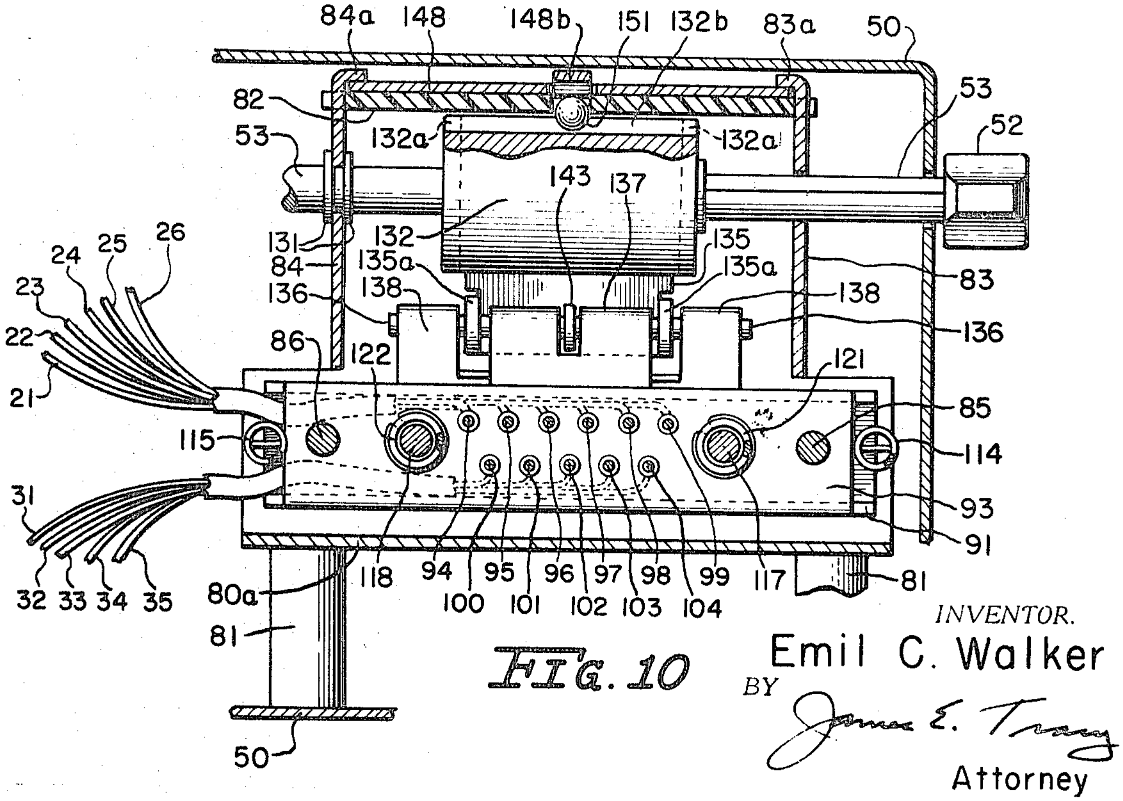
Figures 9A, 9B, 11:
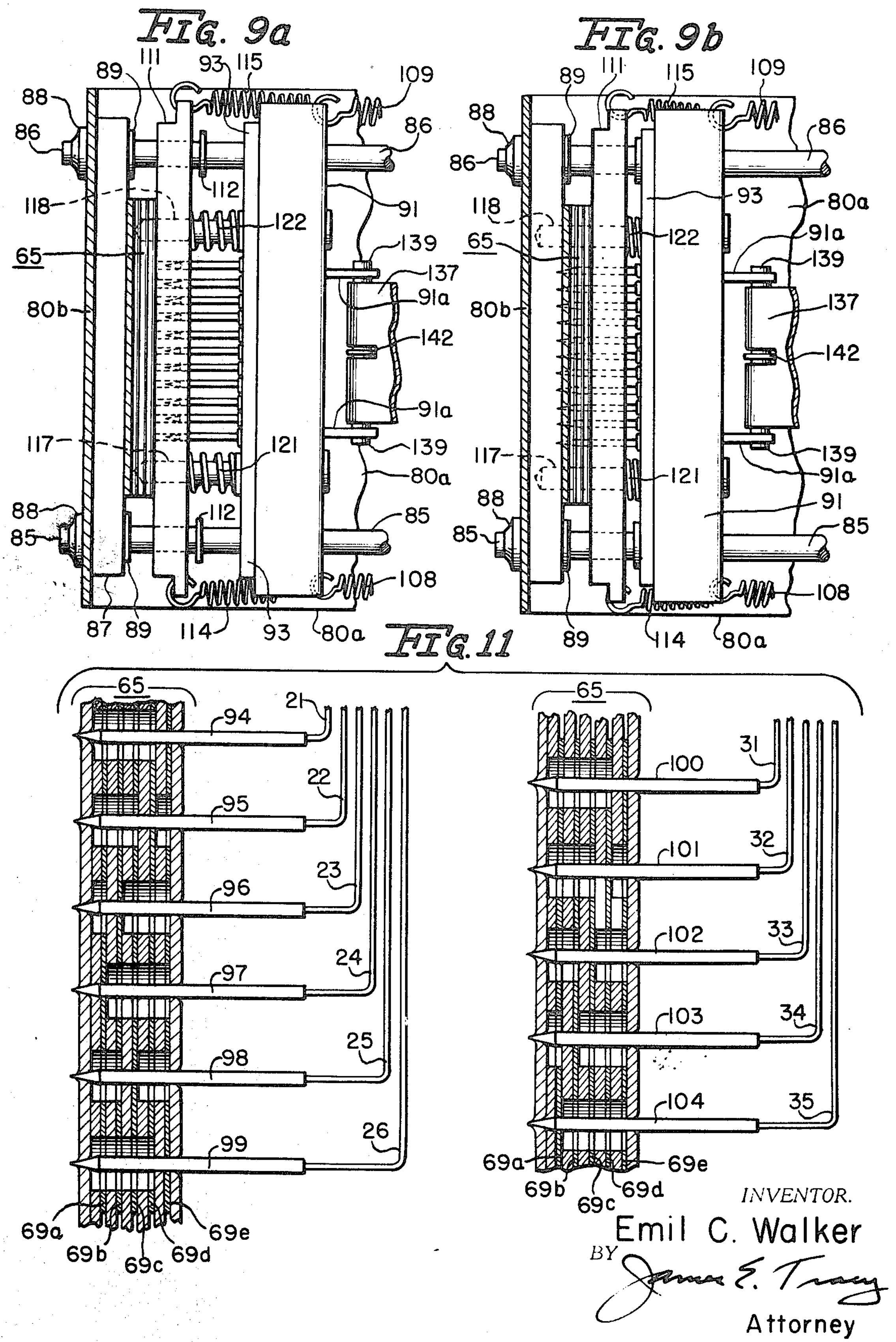

As best seen in FIG. 10, the eleven piercing devices are separated into two rows, six of the devices (sensing probes 94–99) being provided on the top row while the other five piercing pins 100–104 are disposed in the bottom row. As is apparent, this arrangement of the eleven sensing probes matches the arrangement of the eleven sensing areas on each of the conductive patches 69*a*–69*e*. Sensing probes 94–99 are electrically connected to input conductors 21–26 respectively, while probes 100–104 are electrically connected to respective ones of output conductors 31–35, as best seen in FIG. 11. Probes 94–99 thus may be called input probes while probes 100–104 may be referred to as output probes.

Figures 8, 8A, 8B, 9:
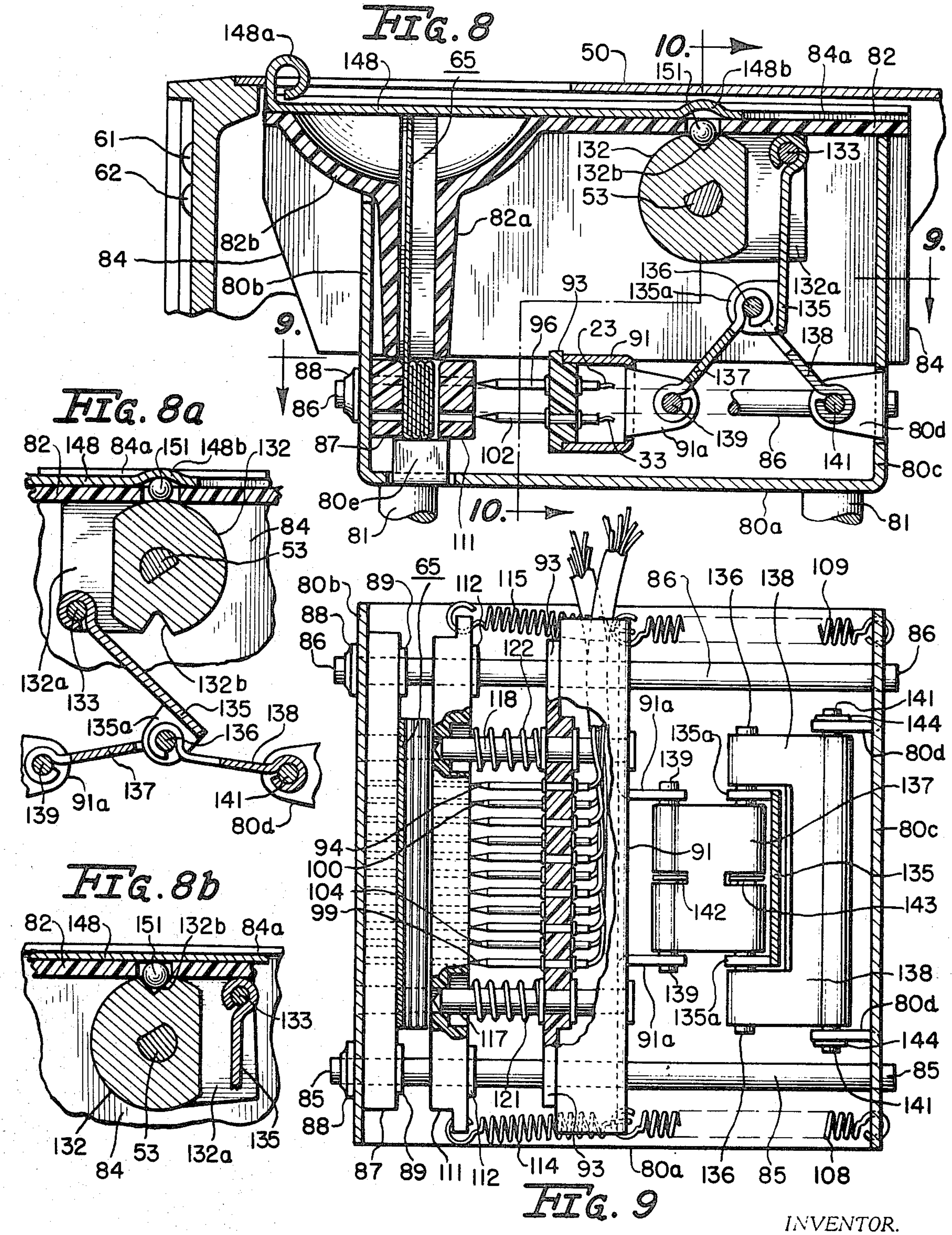

Each end of channel frame 91 is connected to rear upright support 80*c* by a respective one of a pair of coil springs 108, 109. These springs bias or urge frame 91 and piercing probes 94–104 toward upright support 80*c*. A plastic stripper or pin guide plate 111 is also slidably mounted on guide rods 85 and 86 for limited movement in the axial direction of the rods. Specifically, rods 85 and 86 extend through apertures or bores of stripper plate 111. The distance of permissible movement is limited by a pair of E-shaped retaining rings 112 each of which is mounted in a groove of a respective one of rods 85, 86 between stripper plate 111 and pin holder 93. A pair of coil springs 114, 115 connect respective ends of stripper plate 111 to the corresponding ends of channel frame 91. In this way, when frame 91 and the sensing probes are established in their rearwardmost position (as illustrated in FIGS. 8 and 9), coil springs 114 and 115 will be sufficiently tensioned to urge stripper plate 111 toward channel frame 91.

Rigidly mounted to holder 93 and frame 91 are a pair of pilot pins 117, 118. Channels or bores in both stripper plate 111 and die block 87 register or align with pilot pins 117 and 118. When frame 91, and the sensing elements attached thereto, are moved to their most forward position (namely closest to front upright support 80*b* as shown in FIG. 9*b*) pins 117 and 118 extend into the bores of stripper 111 and die block 87 with which the pins are registered.

A guide channel or bore for each of piercing probes 94–104 is provided in each of plate 111 and die block 87. These guide holes register or align with their associated respective sensing probes in order that the probes may be guided and accommodated as frame 91 is moved toward front upright support 80*b*. In FIG. 9 it will be noted that the ends of pilot pins 117 and 118 are slightly pointed. This facilitates accurate indexing or registration of sensing probes 94–104 with their associated guide holes in stripper plate 111. A respetcive one of a pair of coil springs 121, 122 surrounds each of pilot pins 117, 118 in order to push stripper plate 111 toward front upright support 80*b* when frame 91 is moved in that direction.

Channel frame 91 may be moved by the subscriber in the axial direction of guide rods 85 and 86 by manipulating control knob 52. Specifically, operating shaft 53, which is rigidly connected to knob 52, extends through and is journaled in an aperture in each of side plates 83, 84. The shaft is captivated in position by a pair of E-shaped retaining rings 131 respectively mounted in grooves of shaft 53 on the two sides of plate 84, as best seen in FIG. 10. Rigidly connected to shaft 53 between side plates 83 and 84 is a crank member 132 having a pair of spaced apart, projecting portions 132*a*, only one of which is seen in FIGS. 8, 8*a* and 8*b*. A hinge pin of rod 133 extends between and is journalled in apertures of the two projecting portions 132*a*. The upper end of a hinge member 135 is freely mounted on and hangs from hinge pin 133. The lower end of hinge 135 has a pair of parallel, spaced-apart projecting tabs 135*a* each of which has an aperture for receiving and supporting a hinge pin 136. Pin 136 in turn supports for free rotation one end of each of a pair of hinge members 137, 138. The other end of hinge 137 is connected to a pair of projecting tabs 91*a*, struck out of channel frame 91, by means of a hinge pin 139 which extends through apertures in tabs 91*a*. The other end of hinge 138 is connected to a pair of tab portions 80*d*, struck out of rear upright support 80*c*, by means of a hinge pin 141 which is journalled in an aperture of each of the tab portions.

The various hinge pins are held or captivated in position by a series of retaining rings. Specifically a retaining ring 142 snaps into a groove of pin 139, a retaining ring 143 is mounted in a groove of pin 136, and a pair of retaining rings 144 are respectively mounted in a pair of grooves of hinge pin 141.

The arrangement of hinge members 135, 137 and 138 constitutes a toggle linkage. It operates between the two extreme positions as shown in FIGS. 8 and 8*a*, respectively, by manipulation of control knob 52. In FIG. 8 crank 132 is established in its TV position. Counterclockwise movement out of the TV position is prevented by projecting portion 132*a* of crank 132 which butts against the underside of top plate 82. Clockwise rotation of control lever 52, and consequently crank 132, when going from the TV to the PV position, shown in FIG. 8*a*, is also limited by projecting portion 132*a* which engages a different area of the underside surface of plastic top plate 82.

Clockwise rotation of crank 132 from its TV position, shown in FIG. 8, to its PV position, shown in FIG.8*a*, causes hinge pin 133 and consequently pin 136 to lower or descend. Since hinge pin 141 is fixed both vertically and horizontally, whereas hinge pin 139 is only held (by channel frame 91 and guide rods 85, 86) against vertical movement, lowering of pin 136 causes pin 139 and consequently channel frame 91 to move toward front upright support 80*b*. When knob 52 and crank 132 are then moved 180° in a counterclockwise direction from the PV position of FIG. 8*a* to the TV position of FIG. 8 hinge pin 136 raises and draws hinge pin 139 and consequently channel frame 91 toward rear upright support 80*c*.

Plastic top plate 82 includes a ticket chute or slot portion 82*a* (best seen in FIG. 8) which is dimensioned to receive code-bearing element 65. The width of the ticket chute is slightly larger than the thickness of the laminated portion of code ticket 65 and is approximately equal to the distance separating die block 87 and stripper plate 111 when the stripper plate assumes its TV position shown in FIGS. 8 and 9. As will be explained shortly, the subscriber will be permitted to insert code ticket 65 into slot 82*a* only when the sensing mechanism is established in its TV position, shown in FIGS. 8 and 9. Hence, at that time stripper plate 111 will be in its rearwardmost position to allow the inserted code ticket to occupy the position shown in FIG. 8. The lower end of the deposited code ticket is supported or arrested by a pair of tabs 80*e* (only one of which is shown in FIG. 8) struck out of base support 80*a*.

A metallic slide cover 148 is provided for covering up ticket slot 82*a*. Specifically, cover 148 is slidably mounted on top of plastic top plate 82 by a pair of turned-in retaining lips 83*a*, 84*a* formed by the top edges of side plates 83, 84 respectively. The front edge of cover 148 is rolled to form a gripping portion 148*a* to permit the subscriber to conveniently move the slide cover between the two positions respectively shown in FIGS. 7 and 8, FIG. 7 illustrating its open position and FIG. 8 showing its closed position.

Figure 7:
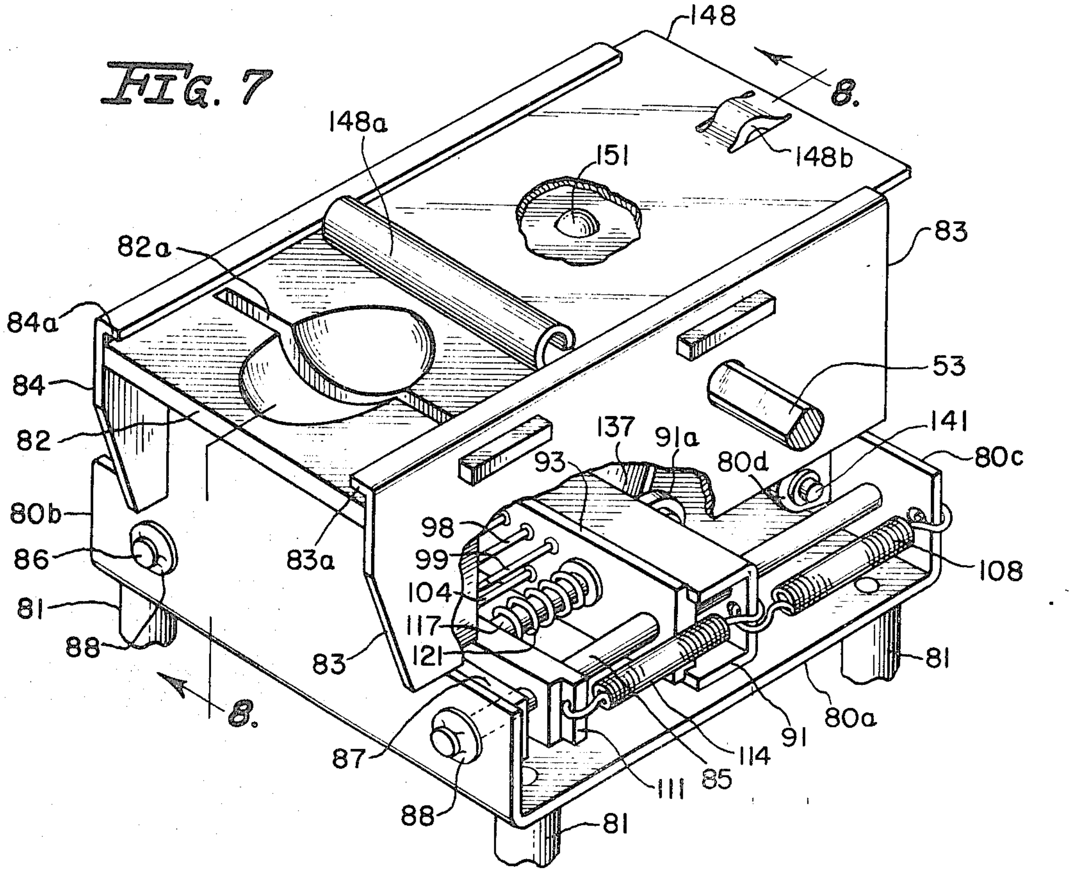

Slide cover 148 may be pushed to its rearwardmost position, shown in FIG. 7, only when knob 52 and consequently crank 132 are established in their TV position. This is achieved by means of a metallic interlock bearing ball 151 and a V-shaped notch 132*b* formed in crank 132 and extending in the axial direction of operating shaft 53. Interlock ball 151 lies and is captivated within an aperture, formed in top plate 82, which prevents any substantial horizontal movement of the ball. Limited vertical movement is permitted, however, being restricted by crank 132 and slide cover 148. In the TV position shown in FIG. 8, notch 132*b* is positioned immediately below interlock ball 151 and thus the ball drops into the notch in the TV position. As seen in FIG. 8, the top portion of ball 151 is aligned with the upper surface of top plate 82. As a consequence, ball 151 presents no obstruction to slide cover 148, permitting it to be moved by the subscriber to the position shown in FIG. 7.

Interlock ball 151 also prevents clockwise movement of crank 132 from its TV to its PV position of FIG. 8*a* as long as slide cover 148 is in its open position shown in FIG. 7. This feature is best seen in FIG. 8*b*. In that open position of slide cover 148, the bottom surface of the cover bears against the top of ball 151, thereby locking the ball in notch 132*b*. Ball 151 consequently locks crank 132 against both clockwise and counterclockwise rotation. As a result, when cover 148 is in its open position no movement of crank 132 in either direction is permitted.

After the subscriber has inserted code ticket 65 into chute 82*a* slide cover 148 must therefore to moved to its closed position, shown in FIG. 8, before crank 132 may be moved 180° clockwise from its TV to its PV position. Clockwise movement of crank 132 out of its TV position is permitted when the cover is closed by an inverted V-shaped recess portion 148*b* formed in slide cover 148. The recess is located so that it is positioned directly over ball 151 when the slide cover is in its fully closed position shown in FIG. 8. Crank 132 may be rotated clockwise out of its TV position of FIG. 8 since notch 132*b* cams ball 151 upward into the confines of recess 148*b*. The recess is so dimensioned that ball 151 may be pushed completely out of notch 132*b* to permit crank 132 to be rotated to its PV position shown in FIG. 8*a*.

After crank 132 has been so rotated, recess 148*b* and interlock ball 151 prevent the subscriber from opening cover 148. To explain, in the PV position crank 132 holds ball 151 in recess 148*b*, as shown in FIG. 8*a*, and any attempt by the subscriber to move slide cover 148 from its closed position will be prevented as ball 151 effectively locks recess 148*b* against any movement. Thus, the subscriber will be unable to open cover 148 when knob 52 is in its PV position.

Consideration will now be given to the operation of the illustrated sensing mechanism. The subscriber is initially required to push slide cover 148 to its open position as shown in FIG. 7 and, as mentioned previously, this can only be done if knob 52 has first been established in its TV position. He may then insert code-bearing element 65 into slot 82*a* whereupon the code ticket will assume the position shown in FIG. 8. In that position, each of the eleven sensing areas of each of the five conductive laminations 69*a*–69*e* registers with a respective one of the eleven sensing probes 94–104. Moreover, pilot holes 71 of the code ticket are aligned with pilot pins 117 and 118. In order to read the code information stored in code ticket 65 and to establish the correct interconnection pattern between input conductors 21–26 and output conductors 31–35, the subscriber must close slide cover 148 and then rotate knob 52 clockwise 180° to its PV position. The resulting rotation of crank 132 causes channel frame 91 and the sensing probes attached thereto to move toward code ticket 65. Pilot pins 117 and 118, being longer than sensing probes 94–104, extend into pilot holes 71 of the code ticket before the sensing probes initially contact the code ticket. This is shown in FIG. 9*a* which illustrates the movable elements of the sensing mechanism at a position intermediate the TV and PV positions. Note that in FIG. 9*a* stripper plate 111 has been moved toward the code ticket from its TV position shown in FIGS. 8 and 9. This is caused by coil springs 121 and 122, which enter into the enlarged portions of the holes in stripper plate 111 for pilot pins 117 and 118, so that movement of channel frame 91 will be imparted or transferred to the stripper plate.

As crank 132 continues to be rotated toward its PV position, sensing probes 94–104 contact and then pierce the laminated portion of the code ticket, culminating in the final position illustrated in FIG. 9*b*. An advantage of the toggle linkage, comprising hinges 135, 137 and 138, will now be appreciated. A feature of such an arrangement is that maximum force is produced with minimal horizontal displacement. When the lancing probes pierce the code ticket the toggle linkage is arranged so that maximum force is produced.

Hence, in the PV position each of the eleven sensing probes 91–104 pierces and senses an assigned series of corresponding sensing areas on the five conductive laminations 69*a*–69*e*. This is clearly illustrated in FIG. 3 which shows code ticket 65 while it is pierced by the sensing probes. When any given one of input probes 94–99 or output probes 100–104 probes a sensing area of a conductive lamination that is cut away or perforated, obviously no electrical connection will be established between that conductive lamination and the sensing probe. On the other hand, when that probe senses and pierces a sensing area that is imperforate, an excellent electrical connection results between the probe and the conductive lamination.

FIG. 11 clearly illustrates all of the electrical connections established between the input and output lancing probes via conductive laminations 69*a*–69*e* for the illustrated given code ticket. In that figure, the laminated portion of the code ticket, while it is being probed by sensing elements 94–104, is shown by two cross-sectional views one of which reveals the sensing areas probed by input probes 94–99 while the other shows the sensing areas examined by output probes 100–104. As clearly shown, input probe 94 pierces and establishes an electrical contact only with conductive lamination 69*e*. That lamination is also pierced by output probe 100 and thus an electrical connection is established between input probe 94 and output probe 100 via conductive lamination 69*e*. Input probe 95 pierces only conductive layer 69*d* which is also pierced by output probe 101, thereby establishing an electrical connection between probes 95 and 101 by way of conductive lamination 69*d*. In similar fashion, input probe 96 connects to output probe 103 via conductive lamination 69*b*, input probe 97 connects to output probe 104 through conductive lamination 69*a*, input probe 98 connects to output probe 102 by way of conductive lamination 69*c*, and input probe 99 pierces conductive layer 69*e* to establish an electrical connection to output probe 100.

Such an interconnection pattern between the input and output probes results in input conductors 21, 22, 23, 24, 25 and 26 being respectively connected to output conductors 31, 32, 34, 35, 33 and 31. These particular interconnections will, of course, be the ones that are required in order for the subscription television receiver of FIG. 1 to successfully decode the program to which code ticket 65 is assigned.

While in the illustrated embodiment of the invention it is contemplated that different code tickets, containing different arrangements of conductive paths, will be used for different programs, the same code ticket may be employed to decode a series of different subscription programs. For example, the same ticket may be used to decode all of the programs during any given evening or during an entire week or month. Moreover, a different interconnection pattern between the outputs of code signal source 19 and the inputs of mode-determining circuitry 40 may be obtained for each one of a series of different programs while employing only a single code ticket for every program in the series. This may be realized, for example, by interposing one or more matrix switching arrangements in series or in cascade with adjustable switching apparatus 30. Each matrix switch may have an adjustable control knob positionable to any one of a variety of different settings each of which permutably connects the input and output conductors of the switch in accordance with a different pattern. For each program, the subscriber will be instructed to adjust the matrix switch or switches to specified settings which will be unique to that program.

Returning now to the specific illustrated case, upon the conclusion of the particular subscription television program which has been decoded by code ticket 65, the subscriber will be obliged to rotate knob 52 counter clockwise from its PV to its TV position, thereby causing crank 132 to rotate counterclockwise from its position shown in FIG. 8*a* to that shown in FIG. 8. This in turn causes channel frame 91 and the sensing probes to withdraw from code ticket 65 and stripper plate 111 to their positions shown in FIGS. 8 and 9. Slide cover 148 may now be pushed back to its open position shown in FIG. 7 to permit the subscriber to remove code ticket 65 from the sensing mechanism. Of course, the dished out portion 82*b* formed in plastic top plate 82, above slot 82*a*, facilitates convenient gripping of the code ticket for removal.

The used code ticket now contains a series of eleven ruptures made by the eleven sensing probes. These ruptures provide a clear indication that the code ticket has in fact been utilized. As mentioned previously, at the end of each month those particular code tickets which are not used by the subscriber may be turned into the subscription operating company for billing purposes. Charges will be assessed only for those programs for which the associated code tickets have been pierced and therefore utilized for decoding.

To summarize the invention in accordance with one of its aspects, there is provided a subscription television receiver (FIG. 1) to which is transmitted coded television signals for a multiplicity of different subscription television programs. Blocks 14, 19, 30, and 40 may collectively be considered decoding apparatus which must be provided with predetermined code information for each program before the coded television signal for that program may be decoded and intelligibly reproduced. Code ticket 65 is a removable code-bearing element containing in concealed form the required code information for a given one of the programs. Sensing means (FIGS. 2–11), controlled by the subscriber, pierces code-bearing element 65 to derive the code information stored therein and to effect decoding of the coded television signal for the given program.

More particularly, the code information stored in code-bearing element 65 takes the form of a plurality of concealed electrically conductive paths (conductive laminations 69*a*–69*e*) insulated from one another. The sensing means includes a group of electrically conductive piercing devices (sensing probes 94–104), insulated from one another, to be actuated by the subscriber to pierce the code-bearing element, each of the conductive paths being pierced and contacted by at least two of the piercing devices to establish an electrical connection from one of those piercing devices to the other via the associated pierced conductive path.

Viewed from a different aspect, the invention provides an adjustable switching apparatus 30 for permutably connecting a plurality of input conductors 21–26 to a plurality of output conductors 31–35 in accordance with any selected one of a multiplicity of different interconnection patterns. The switching apparatus comprises a removable switch setting element 65 containing in concealed form switch setting information representing a give selected one of the multiplicity of different interconnection patterns. Sensing means is provided for piercing removable element 65 to derive the switch setting information stored therein and to permutably connect input conductors 21–26 to output conductors 31–35 in accordance with the given interconnection pattern.

While a particular embodiment of the invention has been shown and described, modifications may be made, and it is intended in the appended claims to cover all such modifications as may fall within the true spirit and scope of the invention.

I claim:

1. A subscription television receiver to which is transmitted coded television signals for a multiplicity of different subscription television programs, comprising:
decoding apparatus which must be provided with predetermined code information for each program before the coded television signal for that program may be decoded and intelligibly reproduced;
a removable code-bearing element containing in concealed form a plurality of conductive circuit paths insulated from and overlaying each other and providing the required code information for a given one of said programs;
and sensing means, included in said decoding apparatus, controlled by the subscriber and including a plurality of conductive lancing pins for piercing said code-bearing element to electrically contact said conductive paths and derive the code information stored in said element, thereby to effect decoding of the coded television signal for said given program.

2. A subscription television receiver according to claim 1 in which said decoding apparatus includes a plurality of input conductors which must be permutably connected to a plurality of output conductors in accordance with a selected predetermined one of a multiplicity of different possible interconnection patterns to effect decoding of said given program, the code information stored in said code-bearing element representing said predetermined interconnection pattern and said sensing means utilizing the information contained in said code-bearing element to establish the required interconnections between said input and output conductors and to achieve decoding of the coded television signal for said given program.

3. A subscription television receiver according to claim 1 in which charges are to be assessed for only those selected programs to which the subscriber actually subscribes, the code information contained in said code-bearing element being stored in such concealed form that access cannot be gained thereto to utilize the stored code information without piercing said code-bearing element in which case ruptures result to provide telltale indications evidencing that said code-bearing element has been utilized and that the subscriber should accordingly be assessed a charge for said given program.

4. A subscription television receiver according to claim 1 in which said sensing means includes a group of said conductive lancing pins, insulated from one another, to be actuated by the subscriber to pierce said code-bearing element, each of said conductive paths being pierced and contacted by at least two of said lancing pins to establish an electrical connection from one of those lancing pins to the other via the associated pierced conductive path.

5. A subscription television receiver according to claim 1 in which said sensing means includes first and second sets of said conductive lancing pins, insulated from one another, to be actuated by the subscriber to pierce said code-bearing element, each of said conductive paths being pierced and contacted by at least one of the lancing pins of said first set and by at least one of the lancing pins of said second set to establish an electrical connection therebetween.

6. A subscription television receiver to which is transmitted coded television signals for a multiplicity of different subscription television programs, comprising:
a decoding device which must be operated in accordance with a predetermined and different code schedule for each program before the coded television signal for that program may be decoded and intelligibly reproduced;

a removable code-bearing element containing in concealed form a plurality of conductive circuit paths insulated from and overlaying each other and providing code information representing at least a portion of the code schedule required to decode a given one of said programs;

and control means for operating said decoding device in accordance with the required code schedule for said given program to effect decoding of the coded television signal for that given program and including a sensing mechanism controlled by the subscriber and having a plurality of conductive lancing pins for piercing said code-bearing element to electrically contact said conductive paths and derive the code information stored in said element.

7. A subscription television receiver according to claim 6 in which the operation of said decoding device is controlled by a decoding signal the waveform of which reflects the code schedule and is at least partially determined by the code information stored in said code-bearing element.

8. A subscription television receiver to which is transmitted coded television signals for a multiplicity of different subscription television programs, comprising:

an adjustable switching apparatus having a multiplicity of different conditions of adjustment and which must be established in a predetermined condition of adjustment for each program before the coded television signal for that program may be decoded and intelligibly reproduced;

a removable switch setting element containing in concealed form a plurality of conductive circuit paths insulated from and overlaying each other and providing code information representing the particular condition of adjustment of said switching apparatus required to decode a given one of said programs;

and sensing means, included in said switching apparatus, controlled by the subscriber and including a plurality of conductive lancing pins for piercing said switch setting element to electrically contact said conductive paths and derive the code information stored in said element, thereby to establish said switching apparatus in the predetermined condition of adjustment required to decode said given program.

9. A subscription television receiver according to claim 1 in which at least a portion of said code-bearing element is of laminated construction and contains a series of said conductive paths parallel to and separated from each other by a series of interleaved insulating layers, in which said sensing means includes a series of said lancing pins, and in which said conductive paths are shaped so that each of said lancing pins pierces and electrically engages at least one of said conductive paths while effectively bypassing, and thereby being insulated from, at least one other conductive path.

References Cited

UNITED STATES PATENTS

| | | | |
|---|---|---|---|
| 2,286,812 | 6/1942 | Keefe | 235—61.12 |
| 2,889,532 | 6/1959 | Slack | 235—61.12 |
| 3,011,015 | 11/1961 | Shanahan et al. | 178—5.1 |
| 3,065,294 | 11/1962 | Toulon | 178—5.1 |
| 3,274,333 | 9/1966 | Shanahan | 178—5.1 |

ROBERT L. GRIFFIN, Primary Examiner

D. E. STOUT, Assistant Examiner